United States Patent [19]

Grenci et al.

[11] Patent Number: 5,341,567
[45] Date of Patent: Aug. 30, 1994

[54] METHOD OF MAKING CLEAN SOCKET FIT CONNECTION

[76] Inventors: Charles A. Grenci, 205 Brown Rd., Montrose, Colo. 81401; R. Dallas Clayton, 200 Altez S.E., Albuquerque, N. Mex. 87123

[21] Appl. No.: 894,464

[22] Filed: Jun. 5, 1992

[51] Int. Cl.$^5$ ............................................. B23P 11/02
[52] U.S. Cl. .................................. 29/890.141; 29/451; 285/350
[58] Field of Search ............... 29/890.141, 450, 451, 29/525, 235, DIG. 44; 285/350, 347, 349

[56] References Cited

U.S. PATENT DOCUMENTS

| | | | |
|---|---|---|---|
| 646,590 | 4/1900 | Williams | 285/350 X |
| 2,478,818 | 8/1949 | Geiger et al. | 285/350 X |
| 2,926,937 | 3/1960 | Parsons | 285/350 |
| 3,792,878 | 2/1974 | Freeman | 285/347 X |
| 4,027,901 | 6/1977 | Forni | 29/451 X |
| 4,066,281 | 1/1978 | DeBonis | 29/451 X |
| 4,705,307 | 11/1987 | Chelette | 285/350 X |

FOREIGN PATENT DOCUMENTS 461456 11/1949 Canada ................................ 285/350

*Primary Examiner*—Timothy V. Eley
*Attorney, Agent, or Firm*—Milton S. Gerstein; Marvin N. Benn

[57] ABSTRACT

The invention relates specifically to an improved method of joining plastic socket fit piping components for vacuum, pressure, and structural applications where a leak and contamination free connection is needed. A unique Dual Face/Circumferential Elastomer Seal is installed in a special Seal Groove located on the end of the male component. The male components are then inserted into the female sockets until contact is made between the Dual Face/Circumferential Elastomer Seals and the Female Socket Base Surfaces. The final assembly is evacuated with a vacuum pump to actuate and fully compress the seals. The final assembly is then checked for leaks. If the connections are to remain under vacuum and the ability to disassemble is advantageous, no further work is required. If the assembly is to contain positive pressure or withstand heavy structural forces, a hollow, Heated Retaining Plug is inserted through a Female Socket Retaining Collar and the Female Socket Wall into the Male Component Wall, while the assembly is still under Vacuum Seal Actuation/Compression. The number of Heated Retaining Plugs that are inserted is determined by the amount of pressure and structural force that the assembly is required to contain.

3 Claims, 6 Drawing Sheets

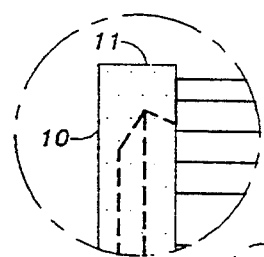
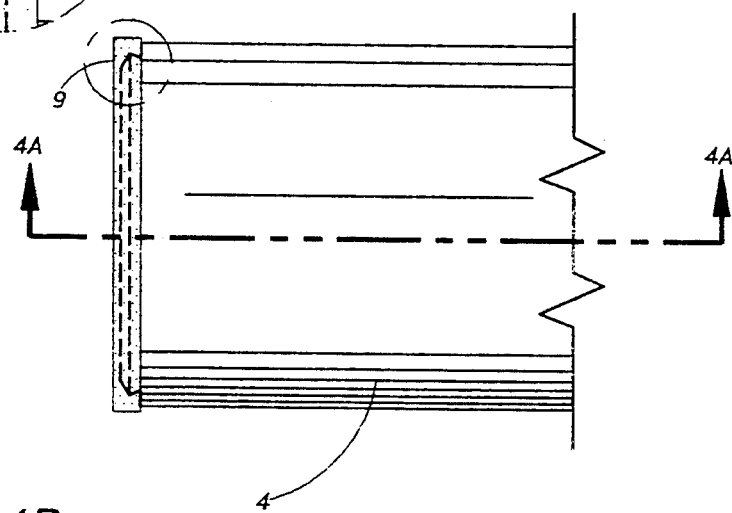
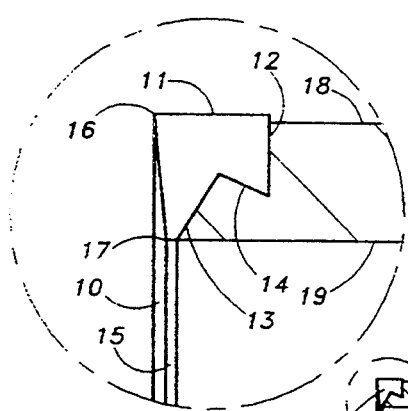
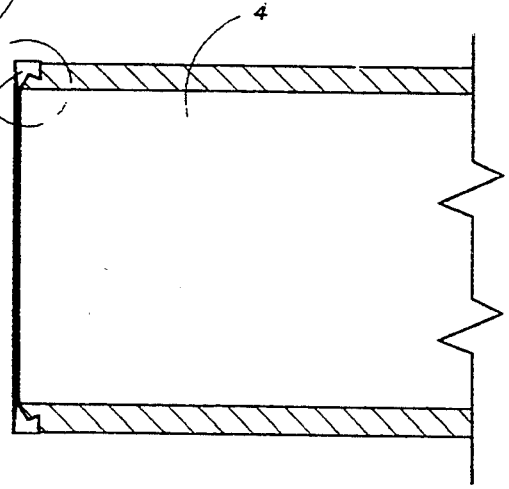

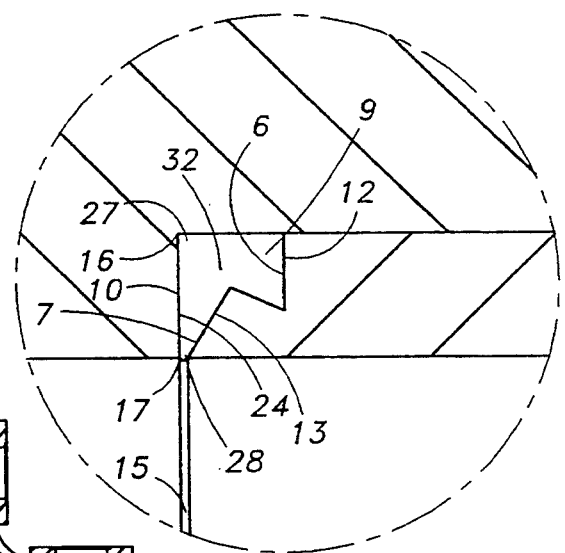
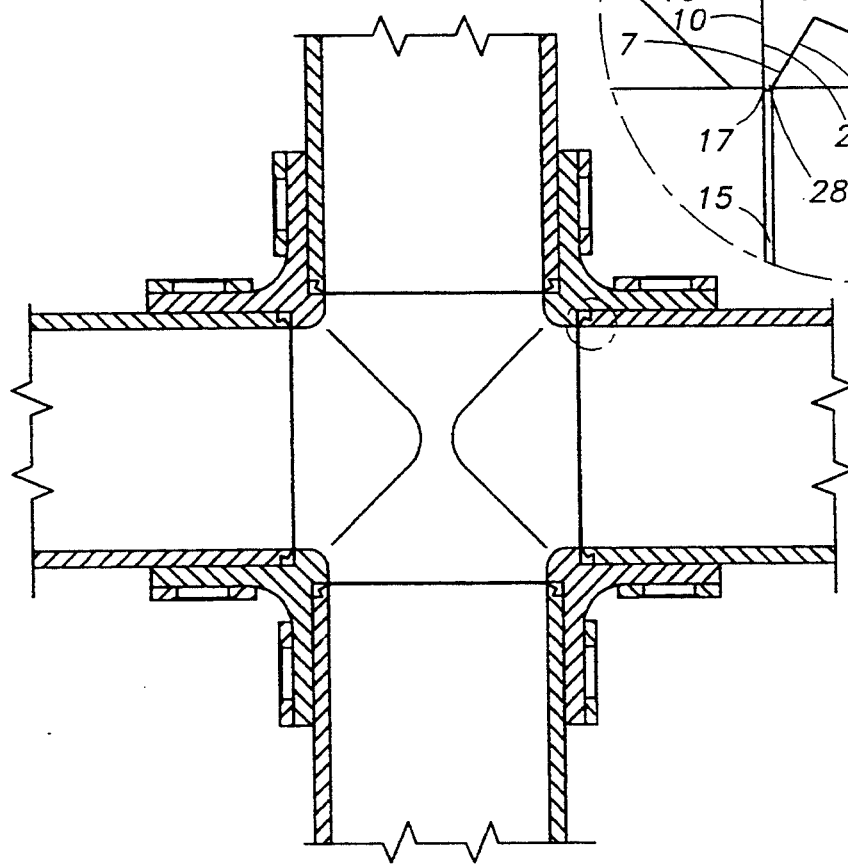

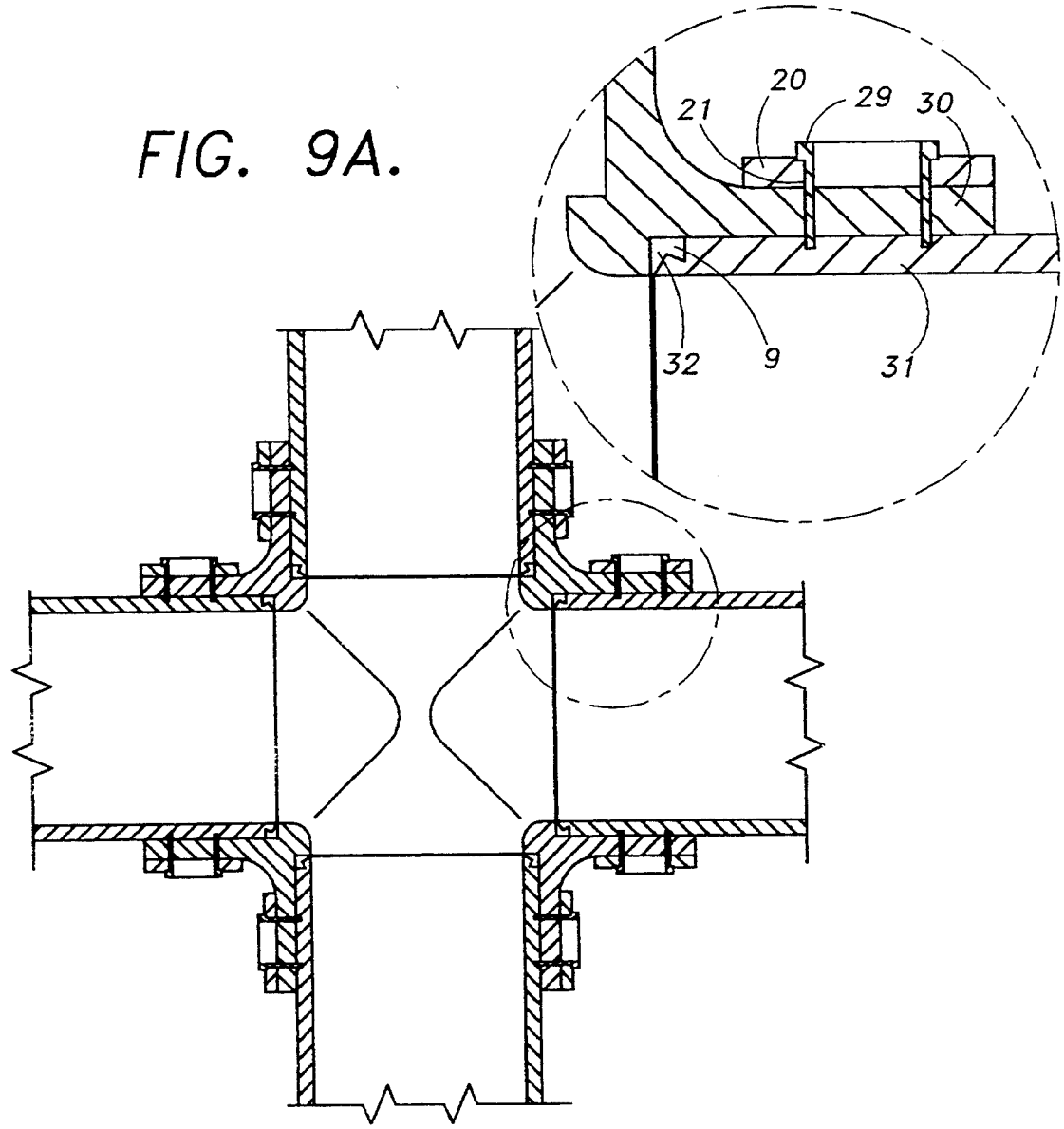

METHOD OF MAKING CLEAN SOCKET FIT CONNECTION

BACKGROUND OF THE INVENTION

1. Field of the Invention (Technical Field)

The invention relates specifically to an improved method of joining plastic socket fit piping components for vacuum, pressure, and structural applications where a leak and contamination free connection is needed.

2. Background Art

Plastic socket fit components are commonly used in the assembly of piping systems. Traditional socket fit components require permanent cemented or welded assembly. This type of assembly is not well suited for clean vacuum or pressure piping systems due to the potential for contamination entrapment voids between the female socket inside diameter and the inserted male component outside diameter. Often, the cement used to join the male component to the female socket is a source of contamination to the process vacuum, gas or fluid. In addition, cemented joints have been known to fail in certain basic applications, such as compressed air service, where the integrity of the cement is compromised oil in the compressed air.

SUMMARY OF THE INVENTION

The invention is an improved method of joining plastic socket fit piping components for vacuum, pressure and structural applications. The Clean Socket Fit Connection provides a leak and contamination free connection that is easy and economical to make. A unique Dual Face/Circumferential Elastomer Seal is installed in a special Seal Groove located on the end of the male component. The male components are then inserted into the female sockets until contact is made between the Dual Face/Circumferential Elastomer Seals and the Female Socket Base Surfaces. The final assembly is evacuated with a vacuum pump to actuate and fully compress the seals. The final assembly is then checked for leaks. If the connections are to remain under vacuum and the ability to disassemble is advantageous, no further work is required. If the assembly is to contain positive pressure or withstand heavy structural forces, a hollow, Heated Retaining Plug is inserted through a Female Socket Retaining Collar and the Female Socket Wall into the Male Component Wall, while the assembly is still under Vacuum Seal Actuation/Compression. The number of Heated Retaining Plugs that are inserted is determined by the amount of pressure and structural force that the assembly is required to contain.

BRIEF DESCRIPTION OF THE DRAWINGS

The accompanying drawings, which are incorporated into and form a part of the specification, illustrate the preferred embodiment of the invention and, subsequently, are not to be construed as limiting the invention.

FIG. 3A is an elevation view of the section of FIG. 2A, with the invention's dual face/circumferential elastomer seal installed;

FIG. 3B is an enlarged elevation view of the invention's dual/circumferential elastomer seal installed of FIG. 3A;

FIG. 4A is an elevational cross-sectional view taken along line 4—4 of FIG. 3A;

FIG. 4B is an enlarged elevation view of the invention's dual face/circumferential elastomer seal geometry;

FIG. 8A is an elevational view of the socket fit cross of FIGS. 7A and 7B;

FIG. 8B is an enlarged view of the invention's dual face/circumferential elastomer seal after vacuum seal actuation/compression;

FIG. 9A is an elevational view of the socket fit cross of FIGS. 8A and 8B with installed heating plugs;

FIG. 9B is an enlarged view showing the installed heating plugs.

DESCRIPTION OF THE PREFERRED EMBODIMENTS

Figure 1A:
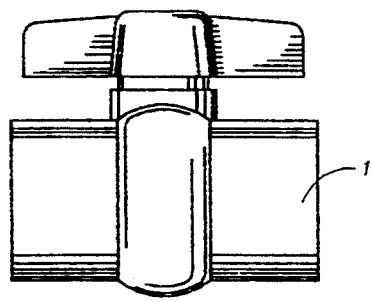
FIG. 1A is an elevation view of a socket fit valve.
Figure 1B:
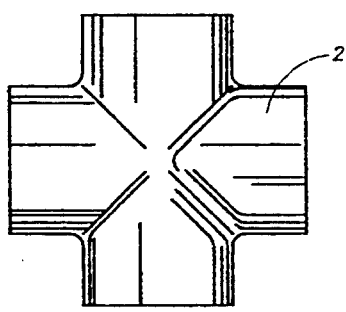
FIG. 1B is an elevation view of a socket fit cross.
Figure 1C:
FIG. 1C is an elevation view of a pipe section.

Referring to FIG. 1, a plastic Socket Fit Valve 1, a plastic Socket Fit Cross 2 and a plastic Pipe Section 3 are shown to illustrate some of the socket fit components which can utilize the Clean Socket Fit Connection.

Figure 2B:
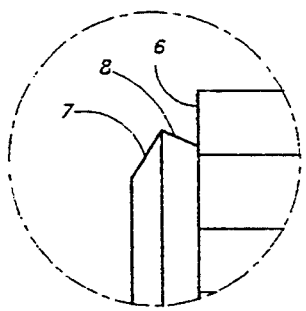
FIG. 2B is an enlarged view of the invention's seal groove.
Figure 2A:
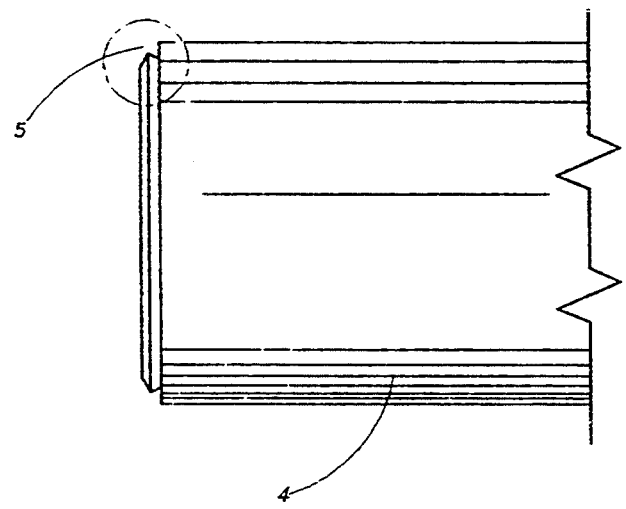
FIG. 2A is an elevation view of a pipe section with the invention's seal groove installed.

Referring to FIG. 2, a plastic Pipe Section With Seal Groove 4 is shown with enlarged detail of the Seal Groove 5 geometry that is installed on the end of male components through cutting or molding. The Seal Groove 5 geometry consists of three basic surfaces; a Seal Groove Primary Compression Surface 6, a Seal Groove Secondary Compression Surface 7 and a Seal Groove Retaining Surface 8. The function of these surfaces will be explained in later figures.

Referring to FIG. 3, a plastic Pipe Section With Seal Groove 4 is shown with the Dual Face/Circumferential Elastomer Seal 9 stretch installed over the Seal Groove 5 to insure that a tight fit is created. The enlarged detail shows the Seal Circumferential Surface 11 and the Seal Face Surface 10, which will be described further in later figures.

Referring to FIG. 4, a cross section of the plastic Pipe Section With Seal Groove 4 and Dual Face/Circumferential Elastomer Seal 9 in FIG. 3 is shown. The enlarged detail in this figure shows the geometry of the Dual Face/Circumferential Elastomer Seal 9, which consists of the following surfaces; a Seal Face Surface 10, a Seal Circumferential Surface 11 that is slightly larger in diameter than the Male Component Outside Diameter Surface 18, a Seal Primary Compression Surface 12, a Seal Secondary Compression Surface 13, a Seal Retaining Surface 14, a Seal Process Contact Surface 15 that is flush with the Male Component Process Contact Inside Surface 19, a Seal Primary Contact Corner 16 and a Seal Secondary Contact Corner 17. The function of these surfaces will be explained in later figures.

Figure 5:
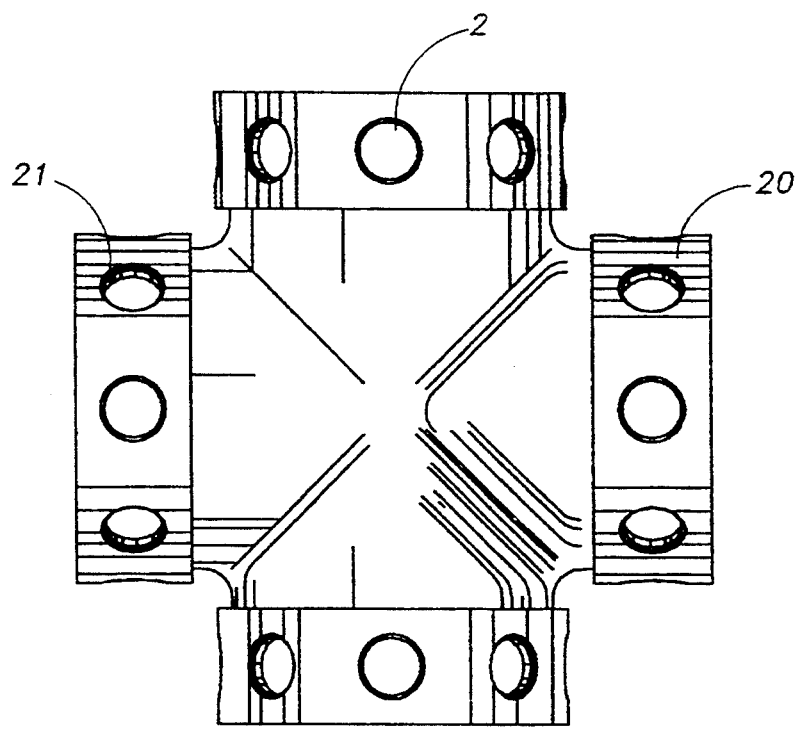
FIG. 5 is an elevation view of a Socket Fit Cross with Female Socket Retaining Collars installed.

Referring to FIG. 5, the plastic Socket Fit Cross 2 from FIG. 1 is shown with Female Socket Retaining Collars 20. These collars are installed at this stage if the Clean Socket Fit Connection is to contain positive pressure or withstand structural forces. The Female Socket Retaining Collar 20 provides multiple Retaining Plug Guide Holes 21, which will be described further in later figures.

Figure 6:
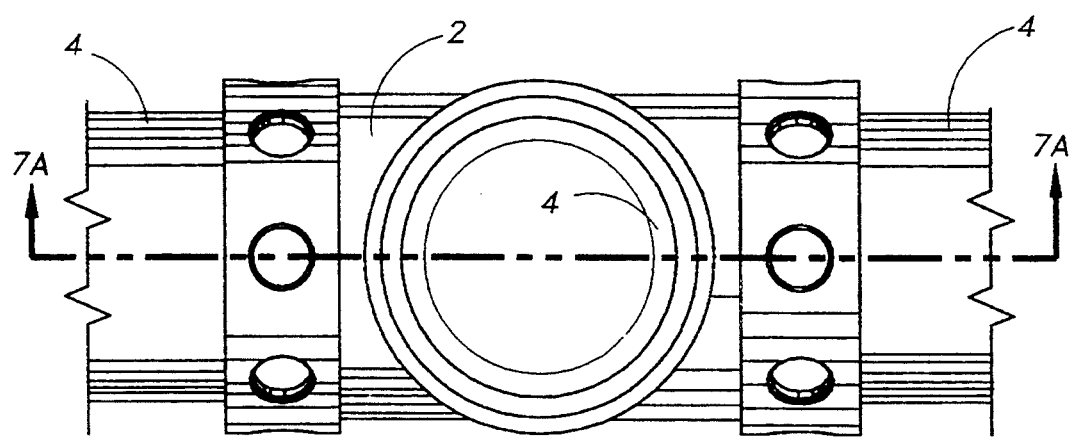
FIG. 6 is a plan view of the Socket Fit Cross in FIG. 5 with the Pipe Section shown in FIG. 3 installed.

Referring to FIG. 6, a plan view of the plastic Socket Fit Cross 2 in FIG. 5 is shown with the plastic Pipe Sections With Seal Grooves 4 from FIG. 3 inserted into each female socket.

Figure 7B:
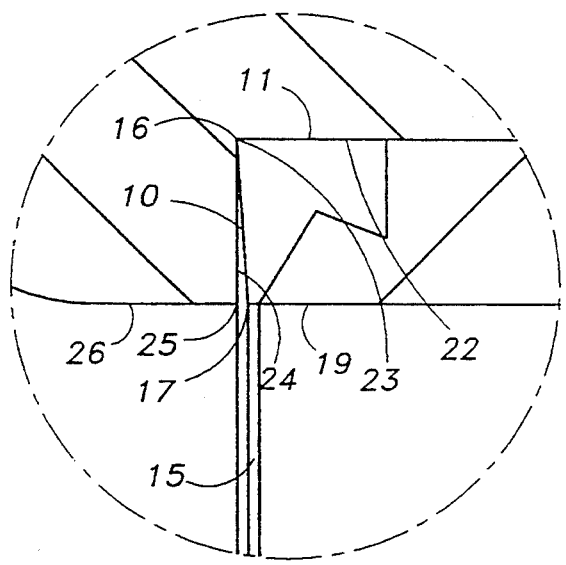
FIG. 7B is an enlarged view of the dual face/circumferential elastomer seal relationship to the female socket base surface 24 prior to vacuum seal actuation/compression.
Figure 7A:
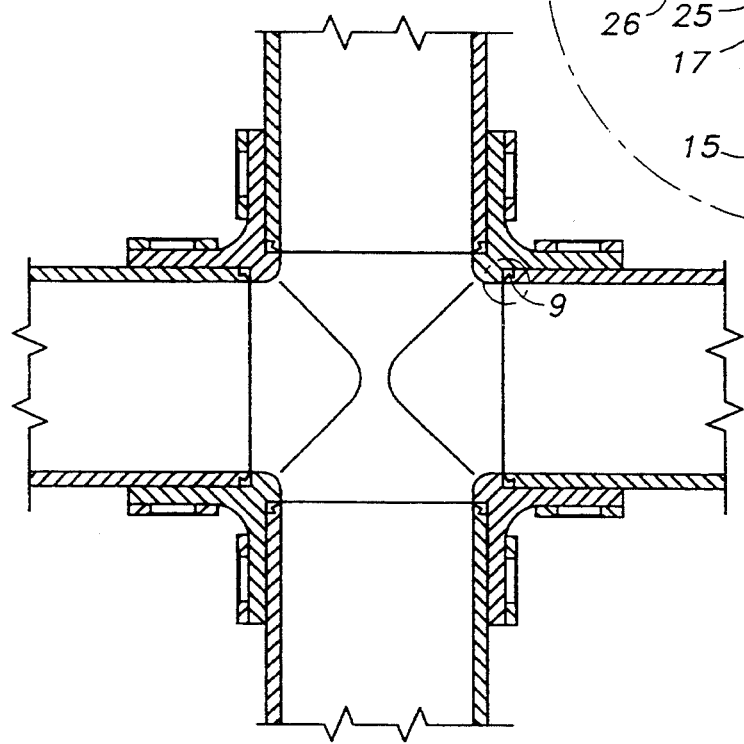
FIG. 7A is a cross-sectional view taken along line 7a–7A of FIG. 6.

Referring to FIG. 7, a cross section of the assembly in FIG. 6 is shown. This figure shows the relationship of the inserted plastic Pipe Section male components to the female sockets prior to Vacuum Seal Actuation/Compression. The enlarged detail shows the Seal Circumferential Surface 11 in contact with the Female Socket Inside Diameter Surface 22 and the Seal Primary Contact Corner 16 touching the Female Socket Primary Contact Base Corner 23. The contact of these surfaces provides a preliminary seal for final Vacuum Seal Actuation/Compression. At this point there is a contamination entrapment area between the Seal Face Surface 10 and the Female Socket Base Surface 24. When the assembly is evacuated with a vacuum pump, the male component is pulled into the female socket until the Seal Secondary Contact Corner 17 contacts the Female Socket Secondary Contact Base Corner 25. The progressive elimination of the gap between the primary seal contact corner and the secondary contact corner minimizes the potential for trapped gas pockets in the Seal Face Surface 10. This substantially reduces the potential for a vacuum virtual leak. A vacuum virtual leak is a leak that is not external in nature but, rather, a trapped gas volume that slowly leaks into the assembly interior vacuum space. Vacuum virtual leaks are difficult to locate with conventional leak detection equipment that is designed to detect a leak from the exterior of the assembly to the interior or visa-versa. The Seal Process Contact Surface 15 separates the Male Component Process Contact Inside Surface 19 from the Female Component Process Contact Inside Surface 26. Any contact between the component inside surfaces prior to a seal surface would create a contamination entrapment area. The Seal Process Contact Surface 15 prevents the creation of a contamination entrapment area while presenting a minimum amount of elastomer surface area to the contained process. This provides a smooth boreline transition between the Male Component Process Contact Inside Surface 19 and the Female Component Process Contact Inside Surface 26. The minimal amount of exposed elastomer reduces the amount of gas that is able to permeate through the Dual Face/Circumferential Elastomer Seal 9 material.

Referring to FIG. 8, the assembly in FIG. 7 is shown after the assembly has been evacuated with a vacuum pump until full Vacuum Seal Actuation/Compression 32 has been achieved. Full Vacuum Seal Actuation/Compression 32 is accomplished through the following sequence of events. When vacuum is applied to the assembly, the male component is drawn into the female socket actuating the seal in the three stages. In the first stage, the Seal Groove Primary Compression Surface 6 pushes against the Seal Primary Compression Surface 12. This progressively eliminates the gap between the Seal Face Surface 10 and the Female Socket Base Surface 24 from the Seal Primary Contact Corner 16 towards the Seal Secondary Contact Corner 17. When this gap elimination is approximately half completed, the second stage Seal Groove Secondary Compression Surface 7 pushes against the Seal Secondary Compression Surface 13 which completes the elimination of the gap between the Seal Face Surface 10 and the Female Socket Base Surface 24 while directing the compression force on the Dual Face/Circumferential Elastomer Seal 9 toward the Seal Primary Compression Area 27. In the final stage of Vacuum Seal Actuation/Compression 32, the Dual Face/Circumferential Elastomer Seal 9 is extruded toward the Seal Secondary Compression Area 28 until the Vacuum Seal Actuation/Compression 32 force is equal to the force of the vacuum pressure on the male component surface area causing the Seal Process Contact Surface 15 to bulge slightly. The Seal Process Contact Surface 15 bulge indicates full Vacuum Seal Actuation/Compression 32.

Referring to FIG. 9, the assembly in FIG. 8 is shown with the addition of Heated Retaining Plugs 29 that are inserted through Retaining Plug Guide Holes 21 in the Female Socket Retaining Collars 20 until the plugs fully penetrate the Female Socket Wall 30 and partially penetrate the Male Component Wall 31 while the Dual Face/Circumferential Elastomer Seal 9 is under full Vacuum Seal Actuation/Compression 32. The number of Heated Retaining Plugs 29 that are inserted is determined by the amount of pressure the connection is required to contain and/or the amount of structural force the connection is required to withstand.

What is claimed is:

1. A method of connecting an end of a plastic, male vacuum-component to a female vacuum-component in a vacuum system in order to prevent real and virtual leaks therebetween, comprising:
   a) attaching an elastomeric sealing member to the end of the male vacuum-component;
   b) after said step (a), inserting the end of the male vacuum-component into a female vacuum-component until the elastomeric sealing member is in at least partial contact with a mating surface-portion of the female vacuum-component;
   c) creating a vacuum in the vacuum-system in which the male vacuum-component has become part during said step (b);
   d) said step (c) causing the elastomeric sealing member to be drawn completely against the mating surface-portion of the female vacuum-component.

2. The method according to claim 1, wherein said step (b) comprises contacting an outer, annular surface-portion of the elastomeric sealing member against the mating surface-portion of the female vacuum-component, and allowing the remainder of the exterior surface of the elastomeric sealing member to be spaced from the mating surface-portion of the female vacuum-component;

said step (d) causing the remainder of the exterior surface of the elastomeric sealing member that is spaced from the mating surface-portion of the female vacuum-component to be drawn into contact against corresponding parts of the mating surface-portion of the female vacuum-component, in order to prevent virtual leaks in the vacuum-system at the connection of the end of the male vacuum-part with the female vacuum-part.

3. The method according to claim 2, wherein the elastomeric sealing member has the inwardly-sloping, exterior, annular surface, whereby, when said step (b) is performed, the an outer, annular portion of the inwardly-sloping, exterior, annular surface contacts against a corresponding surface of the female vacuum-component;

said step (d) causing the inwardly-sloping, exterior, annular surface to be gradually and increasingly drawn, in a wedge-like manner, into contact against mating surface-portions of the female vacuum-component, until all of the inwardly-sloping, exterior, annular surface comes into contact with mating surface-portions of the female vacuum-component, whereby gas molecules located between the juxtapositioned surfaces of the end of the male vacuum-component and female vacuum-component are forced outwardly into the hollow interior of the vacuum-components in order to be pumped away.

* * * * *